E. T. CHANDLER.
HARROW.
APPLICATION FILED JULY 7, 1910.
1,019,221.
Patented Mar. 5, 1912.
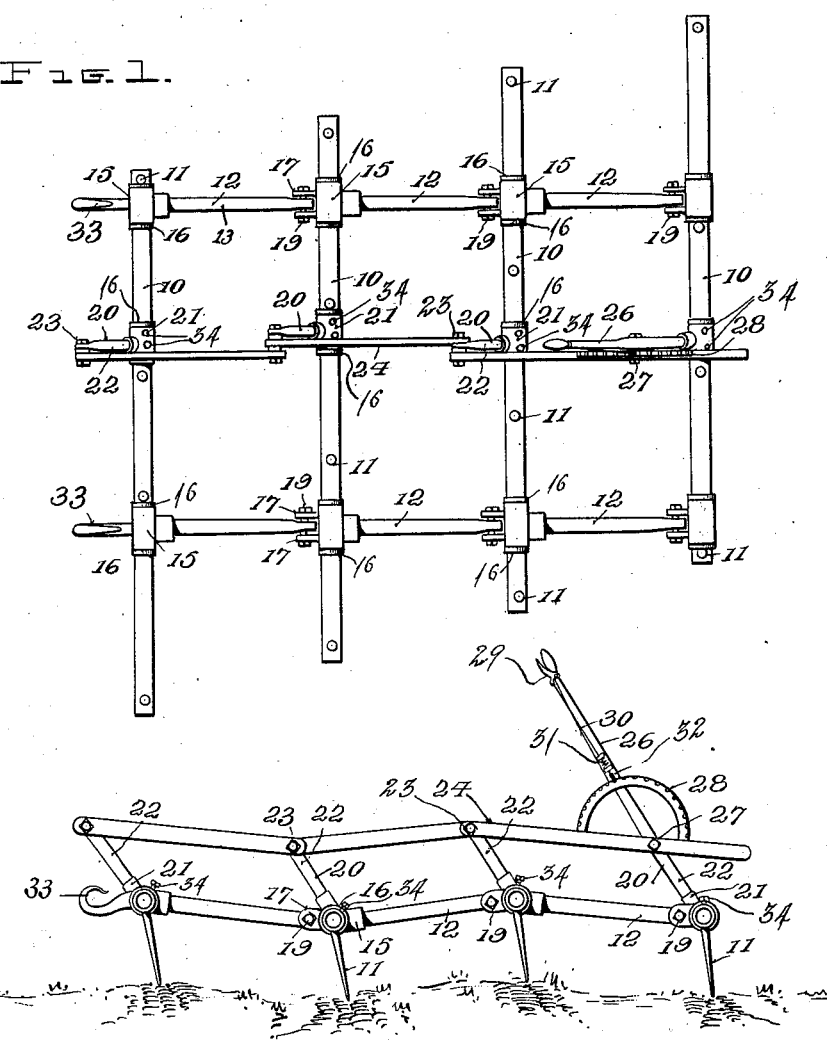
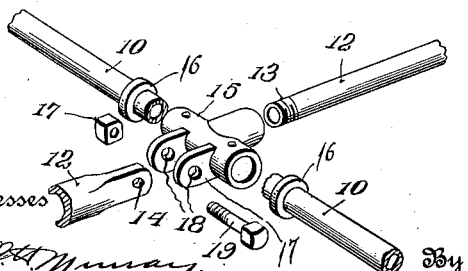
Inventor
E. T. Chandler

UNITED STATES PATENT OFFICE.

EDWARD T. CHANDLER, OF DELMONT, SOUTH DAKOTA.

HARROW.

1,019,221.  Specification of Letters Patent.  Patented Mar. 5, 1912.

Application filed July 7, 1910. Serial No. 570,837.

*To all whom it may concern:*

Be it known that I, EDWARD T. CHANDLER, a citizen of the United States, residing at Delmont, in the county of Douglas, State of South Dakota, have invented certain new and useful Improvements in Harrows; and I do hereby declare the following to be a full, clear, and exact description of the invention, such as will enable others skilled in the art to which it appertains to make and use the same.

This invention relates to harrows and has for an object to provide a harrow in which draw bars are made in sections, these sections being pivotally connected together to permit of the teeth of the harrow conforming to unevenness in the ground.

With the above ends in view, the invention consists in the novel details of construction and combination of parts hereinafter fully described and claimed, it being understood that various modifications may be made in the minor details of construction within the scope of the appended claim.

In the accompanying drawings forming part of this specification: Figure 1 is a plan view of the harrow. Fig. 2 is a side elevation of the harrow. Fig. 3 is a perspective detail view of one of the cross bar sections.

Referring now to the drawings, the harrow is shown to consist of transverse bars 10 from which depend the inclined teeth 11, the transverse bars being preferably formed from lengths of pipes and the teeth from spikes driven through the pipe and secured in position in any preferred manner. To permit of these teeth dropping into hollows in the ground as shown in Fig. 3, I connect the transverse bars by jointed draw bars 12. Each of the draw bars 12 is formed from a plurality of sections each consisting of a tubular shank 13, one end of which is flattened and a bolt opening 14 passed therethrough, and the opposite end of which is threaded and engages the lateral branch of an ordinary T coupling 15 the alined branches of this coupling being sufficient in size to loosely fit the transverse bars to which they are held by collars or similar devices 16. Projecting laterally from the alined branches of the T coupling is a pair of hinge lugs 17, these hinge lugs being spaced apart sufficiently to receive the flattened end of the adjacent section and being formed with bolt openings 18 which register with the bolt openings of said flattened end. A pivot bolt 19 is passed through these registering openings and hingedly connects the sections together.

It is clear that since the draw bars are hingedly connected together adjacent their meetings with the transverse bars each transverse bar is movable vertically independently of the adjacent transverse bar so that the teeth may drop into hollows in the ground or may rise and pass over obstructions in the ground.

For adjusting the inclination of the teeth 11, the following construction is employed:—Rising obliquely from each of the cross bars is a standard 20, this standard being preferably formed from a T coupling 21, the alined branches of which receive the transverse bar and the lateral branch of which receives a tubular arm 22 the upper end of which is flattened and is bolted as shown at 23 to one of the sections of a sectional bar 24, this bar being composed of a plurality of links, the ends of which overlap and are provided with bolt openings through which the bolts 23 are passed.

The rear standard of the series of standards is elongated to form a handle lever 26, the handle lever being pivotally connected to the final section of the sectional bar 24 by means of a pivot bolt 27. A notched segment 28 is secured at its extremities upon the link 24. A latch 29 is pivotally secured to the upper end of the handle lever and is connected to a rod 30 which latter is carried through a guide loop 31 secured to the lever and terminates at its free end in a finger 32 which engages the notches of the segment.

The forward ends of the draw bars 12 are bent outwardly and upwardly to form hooks 33 by means of which the draft animals may be attached to the harrow. In operation, the sections of the draw bars will permit of each cross bar moving in a vertical plane independently of the adjoining cross bars so that the harrow teeth will rise or fall and conform to the ground to be plowed. By rocking the handle lever 26, the inclination of the teeth may be adjusted to any outward angle as will be readily understood.

It will be noted that the couplings 21 of the standards 22 are fixed to the cross bars by means of bolts 34 so that when the standards are actuated through the instrumentality of the links 24, the cross bars will be rotated and thus vary the inclination of the teeth 11.

What is claimed is:—

A harrow including transverse toothed bars, T couplings on said bars, each having alined branches loosely encircling one of said bars, and having a hinge ear on the side opposite to the lateral branch, longitudinal bars each comprising a plurality of alined sections, one end of each section being secured in the lateral branch of a T coupling and the opposite end being pivotally secured to the hinge ear of the next adjacent coupling, and means for rotating said transverse bars in said couplings.

In testimony whereof, I affix my signature, in presence of two witnesses.

EDWARD T. CHANDLER.

Witnesses:
L. E. HOULTON,
FRED. LITZ.

Copies of this patent may be obtained for five cents each, by addressing the "Commissioner of Patents, Washington, D. C."